Dec. 14, 1937.   W. R. PEASE   2,101,871
APPARATUS FOR MOVING AND STACKING HEAVY CARGO UNITS
Filed Sept. 26, 1935   3 Sheets-Sheet 1

Inventor
William R. Pease
By Ellis Spear Jr.
Attorney

Dec. 14, 1937.  W. R. PEASE  2,101,871
APPARATUS FOR MOVING AND STACKING HEAVY CARGO UNITS
Filed Sept. 26, 1935  3 Sheets-Sheet 2
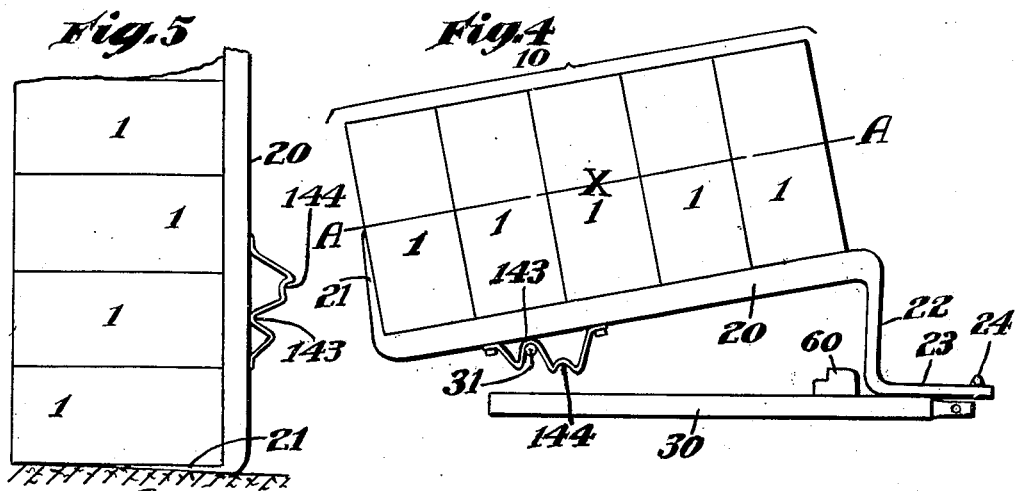
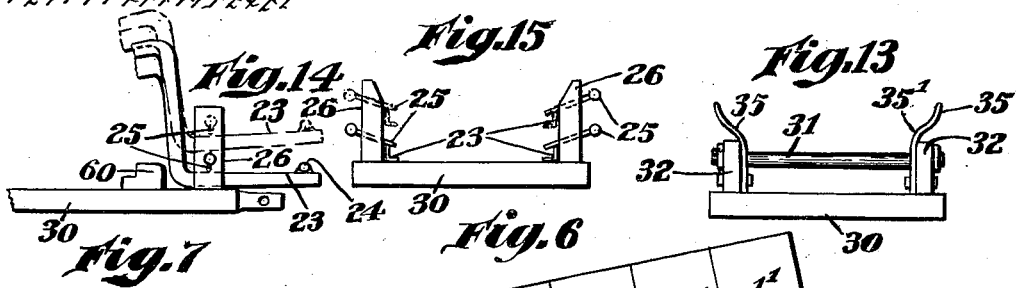
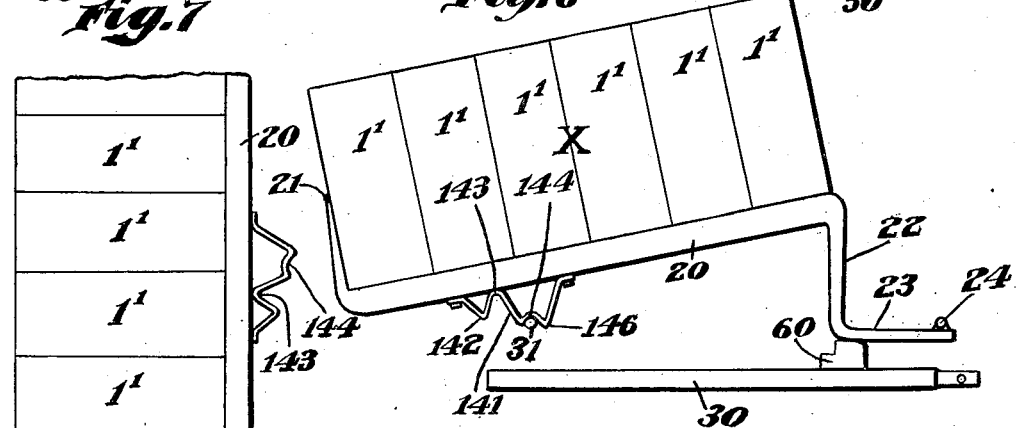
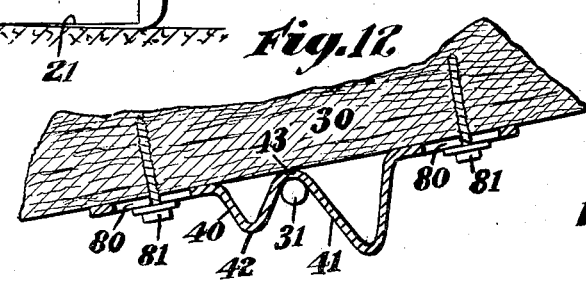
Inventor
William R. Pease
By Attorney

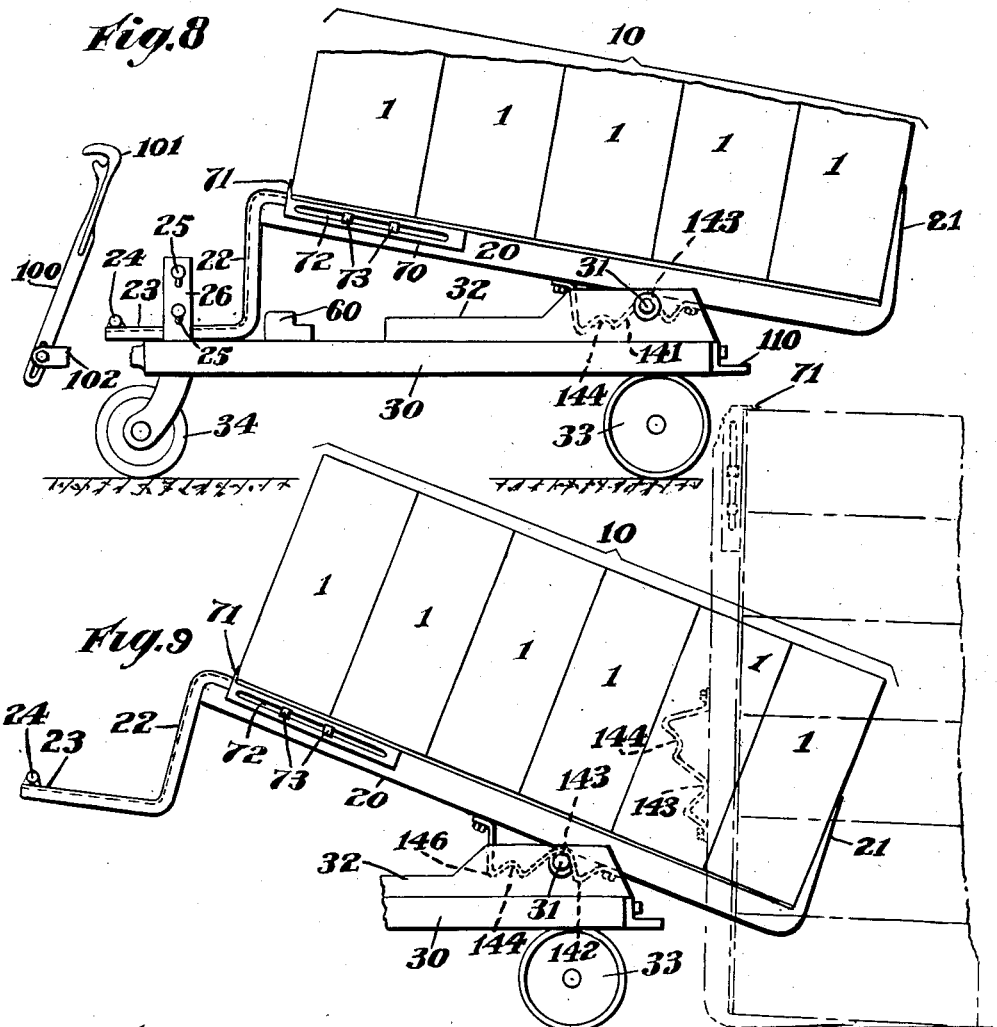

Patented Dec. 14, 1937

2,101,871

UNITED STATES PATENT OFFICE 2,101,871

APPARATUS FOR MOVING AND STACKING HEAVY CARGO UNITS

William Ray Pease, South Portland, Maine

Application September 26, 1935, Serial No. 42,272

3 Claims. (Cl. 254—3)

This invention relates to the loading and unloading of commodities in the course of shipment and particularly those of a ponderous character or great weight concentration. While my invention is applicable to the handling of a very considerable variety of such merchandise, I have selected as an illustrative example the ordinary bale or bat of wood pulp. These represent what is probably a maximum problem of concentrated weight and have to be handled on a tonnage basis which makes for a magnification of the difficulties of the problems involved. The handling of paper pulp or like stock in such form during shipment makes desirable a methodical basis or system of handling. For the purposes of illustration it may be assumed that such pulp has been in transportation as a ship cargo and delivered at a wharf or dockage at which point it is necessary to unload and re-handle for further transportation. As receiving sheds are often at a distance from the re-shipment shed where the cargo is to be stacked, the rate or speed at which a unit of transfer can be moved is of great importance. Heretofore this has had to be effected by hand truck ordinary four wheel trailers or chisel trucks. This required many more men depending on which of the three methods was used. If chisel trucks were used it was necessary to have a large number of these trucks which were expensive and were frequently smashed by rough handling. Such equipment for even a moderate size wharf often ran into twenty to fifty thousand dollars and repairs rendered this equipment costly so that it was often unsatisfactory. Pulp is only one of many cargo items.

Somewhat similar problems are involved in the instance of heavy cased merchandise such as packs of canned goods or other boxed merchandise of relatively small dimension but of high concentration of weight. In the handling of such commodities the stack basis is highly important for the purpose of efficiency and economy within the limited space available in receiving or transfer shed or box car. In such handling the utility of the stack system has been so far demonstrated as to be considered almost a necessity. It appears to be the only efficient basis, as in re-shipping in box cars, where the head room is limited and the stack height correspondingly defined.

Returning to the problem of handling of pulp bales or bats it may be noted as illustrative that such a cargo must be discharged and made available for reshipment in a minimum of time. Mechanical handling has been facilitated by the use of cranes, winches and like loading or discharging contrivances, but the human factor of disposition on the wharf remains the controlling problem of efficiency. To provide simple means adapted to the type of labor available for this work, I have devised a simple system under which such cargoes may be handled promptly and efficiently.

The major problem as I have analyzed it has been that of handling these heavy units such as the pulp bat which weighs approximately four hundred pounds in groups or concentrations for the purposes of movement or stacking which represents the aggregated poundage of approximately a ton. In the handling of any such assembled groups of units it is obvious that the human physical factor suffers a serious difficulty where efficiency in time and accuracy in placement are involved.

In the case of wood pulp in the form of four hundred pound bats selected as probably an extreme test of any organized system of handling, it is to be noted that by usage based on this necessity such units are stacked on the wharf, in the receiving or re-shipping shed and for economic reasons preferably in stacks of four to six of such bats as a stack unit. This depends on the pulp concentration in the bat or bale. Heretofore, it has been necessary to effect such handling by manual labor or with the chisel trucks before mentioned. Manual labor was neither efficient nor expeditious and chisel trucks ran up large labor and overhead costs.

My concept is that of handling a commodity on a stack basis in such a way that the human factor in stacking and handling is relieved of the physical burden imposed by the unusual concentration of weight. Briefly, I accomplish this by providing for the handling of such merchandise in stack form as units which may be moved and stacked accurately and without damage. In this I utilize the heretofore major difficulties of concentrated weight to effect through the utilization of predetermined centers of gravity and momentum a basis of handling by which human effort is reduced to a minimum.

As illustrative of my invention I have shown a schematic analysis of the methodical basis and simple adaptations of mechanisms familiar to those employed in the loading and unloading of cargoes. While more elaborate mechanism might be employed I deem it important to efficiency that apparatus provided be of simple nature and of types familiar to the classes of labor available for such operations.

As also will be discussed later, the matter of adaptability is important because of the diversification of cargoes which are to be encouraged rather than penalized by extra expense in handling. By reason of my methodical basis of handling each cargo unit problem can be analyzed and engineered accordingly.

Throughout the specification and drawings like reference characters are employed to indicate corresponding parts, and in the drawings:

Fig. 4 is a diagrammatic illustration of a loaded frame indicating stack axis and line of gravity centers in position on trailer.

Fig. 5 is a fragmentary view of the same toppled off on its vertical axis in stack position.

Fig. 6 is a view similar to that of Fig. 4, but showing the bales or bats as of different weight concentration.

Fig. 7 is a corresponding view similar to Fig. 5.

Fig. 8 is a side view of a loaded trailer with frame in towing position.

Fig. 9 is a similar view showing the frame partly raised and tipped with its detached position when toppled clear as indicated in dotted lines.

Fig. 10 is a plan view of a portion of the truck with frame in position as shown in Fig. 6.

Fig. 11 shows an enlarged view of the double fork detached.

Fig. 12 is a view of the single fork with slots.

Fig. 13 is a view of the fulcrum bar equipped with centering guides for getting the frame restored to proper position on the truck, and Figs. 14 and 15 show respectively a side and end view of the handle locking posts.

Figure 1:
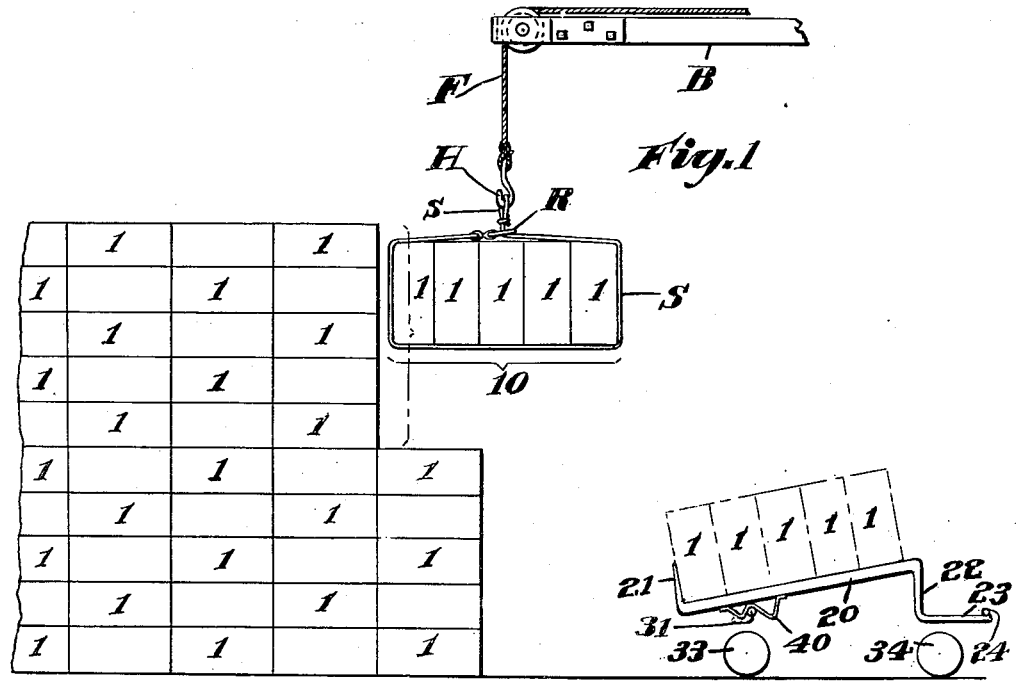
Fig. 1 is a schematic view indicating the cargo stowed as in a ship's hold in the act of being broken out and loaded on a truck frame for movement to stacking position in the receiving or transfer shed.

Considering my invention first from its general method basis and referring to sheet one of the drawings, I have indicated at the left of Fig. 1 what may be considered as a stowed cargo of units 1. As before suggested, these may be considered for the purposes of this disclosure as flat faced pulp bales or bats. These are preferably broken out of the hold by toppling the predetermined number of bales which will make up the stack onto a snorter or sling if such is to be used, as indicated in the drawings, or onto a cheese board or like support (not shown) if such is preferred.

The assembled bales which are to form the stack are hoisted as by a fall F having a hook H adapted to engage the end loop s spliced in the end of the snorter S after it has passed through the ring R at the other end. The load is raised and swung on a boom B which may be any convenient equipment such as one of the cargo booms of the vessel or of a wharf or other crane used for that purpose. The stack unit indicated as an assembly by the numeral 10 is swung over to and deposited upon a frame 20 indicated at the right of Fig. 1. This frame is carried by a trailer truck 30 shown further in detail in Figs. 8 to 10. A train of these loaded trucks can then be hauled by any ordinary tractor R which is available to the place where they are to be dumped. This may be in the receiving shed, but more expeditiously they can be hauled directly to the transfer shed for re-shipment. This is usually in box cars which are loaded from the transfer shed, although it is possible to run the trucks into the cars if ready and dump them there, but experience indicates that this does not represent a real saving of time or labor cost as when the cargo is landed in the transfer shed the wharfage responsibility for handling usually ceases and the actual loading of the cars is taken over by others. I have indicated therefore in Fig. 3 one of the loaded trailers as dumping its loaded frame against previously deposited stacks which may be considered as being located in the transfer shed or at such desired point.

In towing such a train of trailers they may be moved and maneuvered rapidly and accurately so that the equipment may make its round trip from the vessel side to the dump in a minimum time and return ready for another load.

As first explained, the great difficulty in handling such cargoes of heavy units in which the weight was very much concentrated imposed a very severe physical strain on the men who had to wheel and dump such bales.

According to my invention I capitalize this very matter of weight by disposing my stack assembly of these units on the frame with the stack axis in a position generally prone. As will be seen in the drawings and as will be explained later, it is preferably slightly inclined to the horizontal. As will be seen in Fig. 4 this brings the central line of the stack axis A—A into a position slightly inclined to the top of the truck 30 and with the end of the stack which is to constitute its base when in position slightly overhanging the truck. In the form shown in Fig. 4 I have indicated the frame 20 as loaded with a stack 10 consisting of five bales 1 and having its stack center of gravity at X.

The truck is provided with a fulcrum 31 supported in brackets 32 on each side of the top of the truck. This fulcrum bar 31 is preferably located in a plane just forward of that of the rear wheels 33 of the truck so that when the load is placed upon the frame 20 on the truck it will not tend to tip up the truck or raise the front wheels 34.

Further considering the disposition of the load as indicated in Fig. 4, and the frame and truck structure as shown in Figs. 8, 9, and 10, it will be seen that I have provided the longitudinal side rails indicated at 20 with a foot consisting of a pair of end chisel blades 21 which serve to retain the stack on the frame while it is being towed and hold it in assembly while it is being toppled from its fulcrum. At the opposite end I provide a handle member consisting of a leg part 22 of a height to support the frame at the desired angle with reference to the truck top with an angular foot part 23 at the ends of which are short handles 24 adapted to be grasped by the workmen when they are ready to topple the frame and its load from off the truck. During transportation the foot portion 23 is locked down as at 25 by any convenient locking device as by a pin engaged through one of a series of suitable holes in the posts 26 between which the handles 24 are centered and held against lateral movement.

One of the difficulties heretofore experienced with dumping equipment has been the shock imposed on any pivot or hinge of a permanently assembled character. It will be seen that in toppling a load weighing a ton or more from a height at its foot of approximately two feet with a heavy overhead impulse, the impact on striking the ground or floor is very considerable. According to my invention I provide for toppling my loaded frames clear of the truck and entirely off of and free from the fulcrum so that the shock or impact of striking the ground has no effect on the truck or fulcrum members for the frame. For this purpose I provide for cooperation with my fulcrum bar 31, a pair of forks 40 bolted one to each of the side rails or frames 20 on the under side. The forks 40 may be cast or formed conveniently of strap iron bent to give a longer jaw member 41 and a shorter jaw member 42 with an intervening valley 43 and the bottom of which rests on the fulcrum bar 31. The longer jaw 41 provides a maximum resistance to any tendency of the frame to move rearwardly when the truck is being towed and it also by reason of its inclined face serves to correctly center and position the fork on the fulcrum when the empty frame is toppled back onto the truck. The shorter jaw 42 is so proportioned as to clear the fulcrum without binding when the loaded frame begins to topple and the fork begins to leave the fulcrum 31. In this movement, as will be seen in Figs. 4 and 5, the center of gravity X is moved slightly upwardly and over past the plane of the fulcrum 31. This means that as soon as the workmen have begun to lift on the handles 24 and raise the adjacent end of the frame 20 the overhang of the opposite end of the stack begins to become effective and increasingly relieves the strain on the workmen who are lifting on the handles. In fact, my equipment provides for such an advantageous utilization of the very weight of the load that the forward end of the frame lifts with such ease that it is possible to impart to the load an initial momentum which is increased as the weight concentration becomes more and more effective past the fulcrum and into the line of the pull of gravity. Thus, as the stack axis A—A begins to pass from the prone towards its ultimate position of vertical erection, the whole loaded frame actually topples, the jaw 40 leaving the fulcrum 31 and the loaded frame landing on its flat chisel foot blades 21 with the bottom of the pulp stack resting flatly on the ground. In backing up the truck to proper position the workmen preferably gage the distance from the face of the last stack as with a gage stick of suitable length so that the stack is deposited in position on end and snugly against the face of the last stack deposited. The chisel blades or feet 21 are then freed as by a pinch bar and the frame recovered and pulled back so as to topple back onto the truck which has been slightly moved to give the men room to recover the frame. In this, as before stated, the open jaws center the frame on the truck so that when the foot 21 is pulled down into position it can be locked in place and the truck ready to return for another load. The toppling plunge of the loaded frame takes on the aspects of an endwise dive clear of the end of the truck and actually without tendency to back the truck away from the stack so that although as a matter of precaution and safety to the men I have ordered the measuring stick laid behind the wheels 33 as a chock or trig in case of any carelessness in loading or handling, such is not actually necessary as the trucks do not tend to move.

Figure 2:
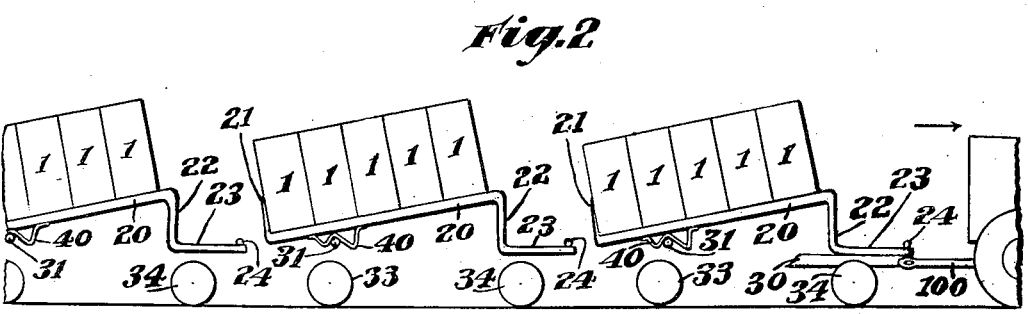
Fig. 2 is a further schematic view showing a plurality of trailers with loaded frames being towed from ship side to receiving or transfer shed.
Figure 3:
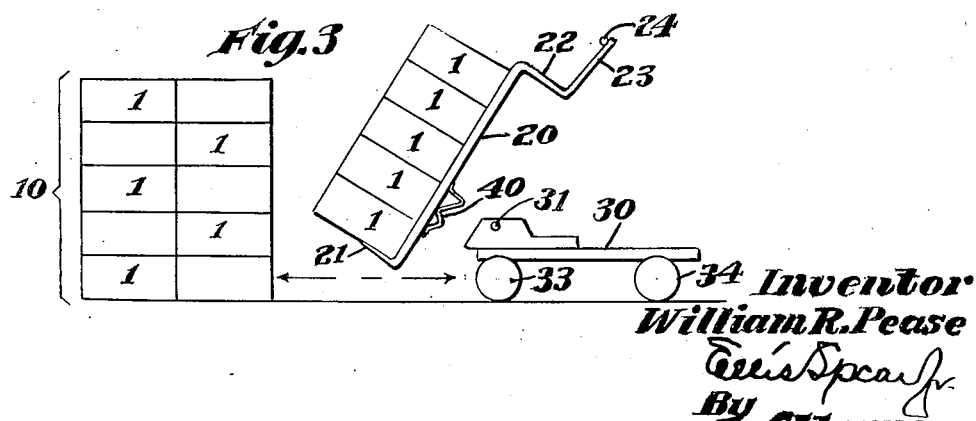
Fig. 3 is a diagrammatic illustration of one of said trailers with frame toppling into stack position.

In Figs. 1 to 3 I have merely indicated the fulcrum fork 40 as a simple fork and in fixed position. Such a simple fork is perfectly satisfactory where the cargo is standard or substantially uniform because it can be permanently in proper relation to the center of gravity of the normal load for the frame.

My invention, however, contemplates provision for variations in these cargo units. In Figs. 4 and 6 the fork member is shown as consisting of a double fork. In this form what may be called the main or normal fulcrum fork 143 is defined by a shorter horn 142 and a longer horn 141.

In the lower peak of the horn 141 I form a notch or valley 144 defined on one side by a somewhat shorter jaw 145 and on the other side by a somewhat longer jaw 146.

As shown in Fig. 4, with a five bale load as indicated, the fulcrum fork 143 is positioned on the fulcrum bar 31 so that the center of gravity X is properly positioned in relation to its vertical plane. If, however, pulp units $1^1$ of a greater concentration and variation in size are to be handled, I can re-adjust my frame by simply moving it over and centering the notch or fork 144 on the fulcrum 31. This slightly raises the frame at the foot end and as it is desirable to preserve the predetermined inclination as to which the centers of gravity have been figured, I provide a block 60 of such height as to compensate for the difference in effective depth between the forks 143 and 144. In this way the predetermined inclination which may be at any advantageous angle desired is preserved. In order to prevent any possibility of the stack units 1 from rocking or wobbling in going over rough places or in crossing tracks, I provide on each side of the frame members 20 a bar 70 having an end peak 71 adapted to be brought up against the lower edge of what is to be the top unit of the stack. The bar 70 is slotted as at 72 and clamped by bolts 73 so that the bar can be adjusted for different heights of stack when in their prone position on the frame. These stacks may of course vary considerably and would so vary especially with different kinds of cargoes, but in the case of pulp it might be explained for the purposes of understanding the illustration that the actual variation in these pulp stacks is usually only between 72″ and 86″ in height. The height of the stack in practice is only limited by the available height or headroom in the box car if such is to be used in re-shipment. Most factories request that 80″ be the maximum height of storage in box car.

Referring to Fig. 12 I have shown a modified form of the simple single fork. This is the same in structure as heretofore described except that its ends are slotted at 80 and clamped to the underside of the frame 20 by bolts 81 so that the fork can be moved longitudinally of the frame rail 20 to change the point of fulcrum by adjustment rather than by shift as shown in the case of the double fork in Figs. 4–9 and 11. When the fork is thus shifted relatively to the frame 20, the fulcrum 31 must be raised or lowered correspondingly to present the desired operation of the equipment. This may be effected as by clamping the fulcrum bar at different levels in a vertical slot in the support 32.

Referring to Fig. 10 it will be seen that the side rails 20 are preferably cross braced by bars 90 which are bent at 91 to form a series of notches longitudinally of the center of the frame. When the stack 10 with the single snorter about it is deposited on the frame, this series of notches accommodates the thickness of the snorter rope and permits it easily to be pulled out after the stack has been safely lodged in position on the frame.

The trucks 30 may be provided with any suitable towing shackle as 100 pivoted to a tongue 102 with any usual coupler beak as 101 for engagement with the rear draw bar 110 at the end of a leading truck or with the draft bar 120 of the tractor T.

My method may be practiced by equipment of a variety of designs and the details of such equipment may be and doubtless will be varied for different ports and different cargoes and different working conditions. The method as indicated is widely adaptable as will be clear from the foregoing illustrative explanation to those familiar with the requirements of their particular ports and the nature of their characteristic cargoes. It will therefore be understood that both method and equipment claimed, shown and described are understood to be illustrative and not as limiting and that my invention is to be liberally construed.

What I therefore claim and desire to secure by Letters Patent is:—

1. Load handling and stacking equipment for use with a wheeled truck having a fixed fulcrum adjacent its rear end, comprising a load-carrying frame, freely detachable fulcrum engaging means detachably engageable with the fulcrum of the truck and so disposed to the rear end of the frame as to support the frame on the truck in clearing relation to the rear end of the truck when the loaded frame is toppled on its fulcrum, and downwardly extending means adjacent the forward end of the frame coacting with the truck body for normally supporting said frame in downwardly and rearwardly inclined position on the truck body with the rear end of the frame overhanging the rear end of the truck body and with the center of gravity of the load slightly in advance of said fulcrum, said last named means constituting a handle element by means of which the forward end of the frame may be raised to a height sufficient to shift the center of gravity of the load rearwardly to a point at which the frame disengages itself from the fulcrum and the load falls clear of the truck into an upended position of discharge.

2. Load handling and stacking equipment for use with a wheeled truck having a fixed fulcrum adjacent its rear end, comprising a detaching load carrying frame, open angular jaws on said frame adjacent its rear end detachably engageable with the fulcrum of the truck, and said frame having downwardly extending means adjacent its forward end coacting with the truck body for normally supporting said frame in downwardly and rearwardly inclined position on the truck body with the rear end of the frame overhanging the rear end of the truck body and with the center of gravity of the load slightly in advance of said fulcrum, said last-named means constituting a handle element by means of which the forward end of the frame may be raised to a height sufficient to shift the center of gravity of the load rearwardly to a point at which the frame detaches itself from the fulcrum and the loaded frame falls clear of the truck into an upended position of discharge.

3. Load handling and stacking equipment for use with a wheeled truck having a fixed fulcrum adjacent its rear end, comprising a detaching load carrying frame having means adjacent its rear end detachably engageable with the fulcrum of the truck and having downwardly and laterally extending means adjacent its forward end coacting with the truck body for normally supporting said frame in downwardly and rearwardly inclined position on the truck body with the rear end of the frame overhanging the rear end of the truck body and with the center of gravity of the load slightly in advance of said fulcrum, said last-named means constituting a handle element by means of which the forward end of the frame may be raised to a height sufficient to shift the center of gravity of the load rearwardly to a point at which the frame detaches itself from the fulcrum and the loaded frame falls clear of the truck into an up-ended position of discharge, and chisel blades at the rear end of the frame for holding the load in the relation specified.

WILLIAM RAY PEASE.